(12) United States Patent
Burmester et al.

(10) Patent No.: US 9,551,424 B2
(45) Date of Patent: Jan. 24, 2017

(54) METHOD FOR CLEANING THE SEAT OF A DOUBLE SEAT VALVE AND DOUBLE SEAT VALVE FOR PERFORMING THE METHOD

(75) Inventors: Jens Burmester, Grambek (DE); Matthias Südel, Ratekau (DE); Arne Schulz, Hamburg (DE); Bastian Tolle, Büchen (DE)

(73) Assignee: GEA TUCHENHAGEN GMBH, Büchen (DE)

( * ) Notice: Subject to any disclaimer, the term of this patent is extended or adjusted under 35 U.S.C. 154(b) by 205 days.

(21) Appl. No.: 14/376,060

(22) PCT Filed: Apr. 25, 2012

(86) PCT No.: PCT/EP2012/001755
§ 371 (c)(1),
(2), (4) Date: Dec. 1, 2014

(87) PCT Pub. No.: WO2013/113341
PCT Pub. Date: Aug. 8, 2013

(65) Prior Publication Data
US 2015/0075567 A1    Mar. 19, 2015

(30) Foreign Application Priority Data

Feb. 3, 2012  (DE) ........................ 10 2012 002 151

(51) Int. Cl.
*B08B 6/00*  (2006.01)
*F16K 1/44*  (2006.01)

(52) U.S. Cl.
CPC ............... *F16K 1/446* (2013.01); *F16K 1/443* (2013.01); *Y10T 137/88038* (2015.04)

(58) Field of Classification Search
None
See application file for complete search history.

(56) References Cited

U.S. PATENT DOCUMENTS

| 6,178,986 | B1 | 1/2001 | Burmester |
| 7,891,376 | B2 | 2/2011 | Neuhauser et al. |
| 8,739,828 | B2 | 6/2014 | Neuhauser et al. |

(Continued)

FOREIGN PATENT DOCUMENTS

| DE | 102007027765 A1 | * 12/2008 | ............. F16K 1/446 |
| DE | 102007038124 A1 | 2/2009 | |

(Continued)

OTHER PUBLICATIONS

Standards Developing Organizations, "3-A® Sanitary Standards for Double-Seat Mixproof Valves, No. 85-02," 3-A Sanitary Standards, Inc., McLean, VA; Mar. 17, 2011; 30 pages.

(Continued)

*Primary Examiner* — Eric Golightly
(74) *Attorney, Agent, or Firm* — Vidas, Arrett & Steinkraus, P.A.

(57) ABSTRACT

A method for cleaning the seat of a double seat valve, the double set valve having a deflection surface bordering the remaining area of a recess not delimiting a circumferential wall and opening out from the latter at a front and radially inside end of a second closing member facing a first closing member. The method rinses the seating when closing members are opened and generates a seat cleaning flow and urges a first cleaning flow through a deflection surface.

21 Claims, 8 Drawing Sheets

(56) References Cited

U.S. PATENT DOCUMENTS

2009/0044874 A1 2/2009 Burmester et al.
2009/0065077 A1 3/2009 Neuhauser et al.

FOREIGN PATENT DOCUMENTS

| DE | 1020100046137 A1 | 3/2012 |
| WO | 9841786 A1 | 9/1998 |
| WO | 2007054134 A1 | 5/2007 |

OTHER PUBLICATIONS

Graf, "Operating Instructions: BAA 365it Complete PMO Version 1.01 Double-seat valve type D 365it Complete PMO type D620 DN 1 1/2"- 6";" Pentair Südmo; Nov. 23, 2011; 42 pages.

* cited by examiner

METHOD FOR CLEANING THE SEAT OF A DOUBLE SEAT VALVE AND DOUBLE SEAT VALVE FOR PERFORMING THE METHOD

CROSS-REFERENCE TO RELATED APPLICATIONS

This is a national stage application of PCT/EP2012/001755, filed on Apr. 25, 2012, which claims priority to DE 10 2012 002 151.8, filed on Feb. 3, 2012.

STATEMENT REGARDING FEDERALLY SPONSORED RESEARCH

Not applicable.

BACKGROUND OF THE INVENTION

The invention relates to a method for cleaning the seat of a double seat valve, which has two serially arranged closing members that are moveable relative to each other, which prevent in the closed position of the double seat valve the overflow of fluids from one valve housing part of a valve housing into another, which delimit amongst each other a leakage cavity both in the closed as well as in the open position, which is connected with the area surrounding the double seat valve via a discharge bore, which is bordered by a tube shaft designed on the first closing member and leading out of the valve housing.

A seat-cleaning-capable double seat valve of the initially identified type for performing the method is known from WO 2007/054 134 A1 or the subsequent application US 2009/0044874 A1. In the case of this double seat valve, the dependently driven (relating to a perpendicular normal position) upper closing member, hereinafter referred to as the second closing member, on a second end section facing an independently driven, lower closing member, hereinafter referred to as the first closing member, has a recess with a cylindrical circumferential wall, which is flush with a cylindrical first seat surface, wherein the recess is dimensioned to receive, during the opening movement, a first end section and a radial first seal of the first closing member in a sealing manner, before the second closing member opens. The first closing member is thereby designed as a pusher piston with a radial first seal and the second closing member either as a pusher piston with a radially acting second seal or conically with an axially/radially acting second seal. The known double seat valve limits among other things the cleaning agent quantity during the respective seat cleaning. Its leakage outlet, which must also discharge these cleaning agent quantities into the area surrounding the double seat valve, is generally measured such that it complies with the requirements or respectively stipulations of the United States Food and Drug Administration of the USA (USFDA) in the "3-A Sanitary Standards for Double-Seat Mixproof Valves, Number 85-02 [1]," which require among other things that the most minimal passage cross-section of the leakage outlet is measured such that it at least corresponds with the passage cross-section of the largest tube conduit that can be connected to the double seat valve (requirement D14.2). Furthermore, in connection with the seat cleaning, additional requirements as per [1] are met, which indicate that the respectively closed seat region is not directly flowed against or pressurized in a pressure-increasing manner by the respectively generated seat cleaning flow (D14.5.2.1) and that the pressure in the closed seat region facing the leakage space must be equal to or less than the atmospheric pressure (D14.5.2.2).

The known double seat valve thus also fulfills other implicit requirements of the above standard as per [1], and namely those that no cleaning agent can pass through in the case of bigger seal defects or even the loss of one of the two seat seals in the course of the seat cleaning of the other closing member via the respective seal defect or respectively the seat region without seat seal. Under these conditions, the known double seat valve not only fulfills the requirement of limiting the cleaning agent quantity and avoiding a direct impact on the seat regions during the seat cleaning, but rather also the requirement of removing the seat cleaning flow to the greatest possible extent without swirling at first into the leakage cavity and from there into the surrounding area, without the respectively closed seat region being directly flowed against or pressurized in a pressure-increasing manner.

Direct impact is understood as all speed components from the respective seat cleaning flow perpendicularly directed at the walls bordering the seat region. It was namely shown that all direct impacts to this effect lead to a conversion of kinetic flow energy to static pressure. Depending on the angle of impact of the flow to the flowed-against wall or body surface, a branch flow with a so-called "branch flow line" results, wherein the latter divides the flow into two halves. The branch flow line itself flows towards the so-called "stagnation point" so that the speed is equal to zero at this point. The pressure increase resulting from this speed stoppage is also called "stagnation pressure". The pressure-increasing mechanisms shown above, if effective, generate a leakage flow over the respective restrictor gap and the defective or no longer present seat seal.

While the aforementioned double seat valve according to WO 2007/054 134 A1 or the subsequent application US 2009/0044874 A1 solves the requirements of the standard as per [1] solely with flow-mechanical means and modes of action on the components of the double seat valve bordering the leakage cavity, DE 10 2007 038 124 A1 or the subsequent application US 2009/0065077 A1 suggests fulfilling the said requirements of the standard as per [1] through a separate third member, a so-called flow barrier element, arranged between the two closing members of the double seat valve and relatively moveable with respect to both. During ventilation of the one closing member and during supplying of the leakage cavity with cleaning agent, this flow barrier element shadows the at least one sealing element and/or the closing member seat of the other closing member, which is located in its closed position, vis-à-vis a direct impact by the cleaning agent entering the leakage cavity. As shown in the description of the aforementioned document, "shadowing" is to be understood such that the sealing element of the respective closing member located in the closed position is not supplied directly and thus with a higher flow speed with the cleaning agent, wherein it is permitted that the cleaning agent is mainly pressure-less and arrives in the area of the closing member seat or of the sealing element of the closing member located in the closed position at a low flow speed so that stagnation pressure cannot form there. As shown in the description, the flow barrier element does not have to rest in a completely sealing manner on the housing side; rather, it is preferably distanced from the housing by a small gap. Furthermore, it can be seen in FIGS. 1, 4 to 7 and 12 to 15 of WO 2007/054 134 A1 or US 2009/0044874 A1 that the leakage outlet fulfills the requirement of the start as per [1] according to D14.2, namely that the most minimal passage cross-section of the leakage outlet corresponds at least with the passage cross-section of the largest tube conduit that can be connected to the double seat valve.

WO 98/41786 A1 (page 11, line 24 to page 12, line 9) or the subsequent application U.S. Pat. No. 6,178,986 B1 (column 6, row 58 to column 7, row 11) already describes but does not claim an independent third member that is relatively moveable with respect to the two closing members of a seat-cleaning-capable double seat valve and is guided in a sealed manner in the cylindrical seating for the first closing member. This known embodiment differs from the object of the post-published DE 10 2007 038 124 A1 or US 2009/0065077 A1 thus mainly through the interaction between the third member, the flow barrier element and the associated cylindrical seating for the first closing member. While the older solution here provides a sealing by means of a radially acting seal in sliding engagement, for the newer solution, the third member does not have to rest in a completely sealing manner on the housing side; rather, it is preferably distanced from the housing by a small radial gap.

The flow barrier element according to DE 10 2007 038 124 A1 or the subsequent application US 2009/0065077 A1 fulfills the aforementioned requirement D14.5.2.1 and, in the case of corresponding dimensioning of the leakage outlet, also the requirement D14.2 as per [1] through its "shadowing" effect in its embodiment sealed on the housing side or even potentially unsealed. The requirement D14.5.2.2 apparently remains unfulfilled because the flow barrier element now appears within the discussed seat-cleaning-capable double seat valve in a significantly modified embodiment, as shown in company document Pentair Südmo Operating Instructions, BAA D 365it Complete PMO, Version 1.01, Double-seat valve type D 365it Complete PMO type D620 [2], published in November 2011 (201111) at URL http://www.suedomo.de/resources/images/790.

The enhanced function of the known flow barrier element designed as an annular body is described in DE 10 2010 046 137 A1, which was published after the company document [2]. The annular body subdivides in the ventilation position of at least one of the closing members together with it the leakage space into a first leakage space section and a second leakage space section. The annular body is designed such that in particular in the respective seat cleaning position generated cleaning medium can pass through the annular body from the first leakage space section into the second leakage space section. This transfer takes place such that the pressure in the second leakage space section is reduced with respect to the pressure in the first leakage space section and the cleaning medium arrives at the leakage outlet from the second leakage space section. Thus, in addition to the function of the shadowing of the seal or respectively of the closing member seat of the closing member located in its closing position, the annular body also takes on the function of the restriction of the respective seat cleaning flow. But this restriction is only possible and sufficient if the annular body is always sufficiently sealed on the housing side and rests respectively in a sealing manner on the ventilated closing member in the necessary manner.

Through this embodiment, it is possible, as illustrated by pages 14 and 25 of the company document [2] and FIG. 1 of DE 10 2010 046 137 A1 with the first closing member and the tube shaft connected with it in mind, to reduce significantly the leakage outlet formed in the tube shaft with respect to the object of DE 10 2007 038 124 A1 or US 2009/0065077 A1 and thus in a manner deviating from clause D14.2 of the standard as per [1]. This deviating design of the double seat valve is possible due to exemption clause D14.2.1.1 of the standard as per [1], which says that a leakage outlet that is reduced with respect to D14.2 is permitted if data is made available with the differently designed double seat valve, which shows that the maximum pressure between the valve seats of the double seat valve is less than or equal to the maximum pressure in a connection line provided with an unreduced leakage outlet between a comparable block valve and bleed valve, called "block and bleed" in the standards as per [1].

The double seat valve according to the company document [2] or DE 10 2010 046 137 A1 has the noteworthy advantage that the valve housing can be designed one to two nominal widths smaller than the design with a leakage outlet that is not reduced in cross-section and thus considerably more cost-effectively because, in the open position of the double seat valve, in which the tube shaft penetrates the connection opening between the valve housing parts, the passage cross-section of the annular gap between the tube shaft and the connection opening, which must correspond with the passage cross-section of the largest tube conduit that can be connected to the valve housing, can be realized without the above nominal width enlargement.

The double seat valve according to the company document [2] or DE 10 2010 046 137 A1 has the big disadvantage that, for one, the third member in the form of a flow barrier element sealed on the housing side in connection with the other characteristics of its arrangement in the leakage cavity and inclusion in the closing member configuration causes a complicated and thus problem-prone constructive structure of the double seat valve. Moreover, this additional built-in part in the leakage cavity with additionally necessary sealing means, corners and dead spaces is generally difficult to clean in the passage and thus questionable for sanitary reasons in the proper range of use. A sufficient restriction of the respective seat cleaning flow is also only ensured when this seat cleaning flow passes the systematically provided restriction points in the flow barrier element and is not guided more or less unrestricted in the bypass in the form-fitting connection between the latter and the closing member located in its seat cleaning position.

Experts are thus looking for a solution for how to realize the exemption clause D14.2.1.1 and the clause D14.5.2.2 of the standard as per [1] without additional built-in parts in the leakage cavity of a seat-cleaning-capable double seat valve, and namely with solely flow-mechanical means and modes of action on the previously present components delimiting the leakage cavity.

The object of the invention is to suggest a method for cleaning the seat of a double seat valve and to further develop a double seat valve of the generic type for performing the method, which, even if the cross-sectional surface of the discharge bore is smaller than that of the largest tube conduit that can be connected to the double seat valve, ensure that the seat cleaning flow is guided to the greatest possible extent without swirling into and out of the leakage cavity, and reliably avoid a pressure-increasing, direct impact on the seat regions.

BRIEF SUMMARY OF THE INVENTION

The method according to the invention for a seat-cleaning-capable double seat valve is based either on the basic closing member configuration as has the known double seat valve according to WO 2007/054134 A1 or it is also applicable to the basic closing member configuration as it is known from the WO 2007/054131 A1. In the case of both double seat valves, a cylindrical appendage for the formation of the respective restrictor gap is arranged on the respective closing member on the leakage space side. Moreover, the present invention uses half the diameter difference of these cylindrical appendages, which permits the formation of a transition area between the sections with different diameters of a connection opening interconnecting the valve housing parts of a valve housing, wherein the sections are assigned to the cylindrical appendages. Furthermore, the closing members are transferable independently of each other through a partial stroke respectively gap-wide into a seat cleaning position for the purpose of rinsing its seatings. A seat cleaning flow generated in the respective seat cleaning position experiences the required restriction in the restrictor gap arranged on the leakage space side on the associated closing member, before it enters a leakage cavity arranged between the closing members. Finally, in the case of both double seat valves, the first seat cleaning flow generated by the first closing member experiences on a rotationally symmetrical deflection surface, which is designed in a recess in the second closing member, a bumpless deflection directed into a discharge bore, wherein the discharge bore is bordered by a tube shaft designed on the first closing member and led out of the valve housing.

In the present invention, the double seat valve for performing the method according to the invention is further developed exclusively based on the double seat valve according to WO 2007/054134 A1.

In order to solve the object underlying the invention, the fundamental inventive idea with respect to the method consists in that the first seat cleaning flow is urged by the deflection surface radially inwards and axially towards the first closing member until it leaves the second closing member at a frontally and radially internal end of the second closing member which end is located outside the recess. The first seat cleaning flow, the handling of which in the leakage cavity is more difficult and problematic than that of the second seat cleaning flow from the beginning, is now deflected and urged very far radially inwards and simultaneously axially towards the first closing member and it no longer flows from the front surface of the recess in the second closing member, but rather from a front surface of the second closing member itself located outside the recess. It is thereby advantageous if the deflection and urging takes place radially and axially in a far-reaching manner and namely up to an outermost end delimiting the second closing member. In the case of the two aforementioned, known double seat valves, on which the invention with the method in mind is based, the first seat cleaning flow was only deflected and urged up to the outlet of the deflection surface out of the front surface of the recess in the second closing member, i.e. on a relatively short flow path.

The suggested technical handling according to the invention of the first seat cleaning flow has the surprising effect in connection with its sufficient restriction that the object underlying the invention, in particular under the conditions of a reduced leakage outlet, is solved to the full extent. A backing up of the first seat cleaning flow in the leakage outlet, which can be formed in the tube shaft through the sequential arrangement of several sections of a discharge bore, does not take place in any of the sections; rather, the respective passage cross-section of the discharge bore is not completely filled at any point so that the atmospheric pressure can reach up to into the leakage cavity. Thus, an impermissible formation of excess pressure with respect to the atmospheric pressure cannot take place in the leakage cavity. The same goes for the second seat cleaning flow, which, from the start, is easier to handle than the first seat cleaning flow due to its even more effective ejector effect in the leakage cavity.

The method according to the invention can solve the problem according to the application even more with a double seat valve of the type described above in which the leakage outlet is not reduced with respect to the passage cross-section of the largest tube conduit that can be connected to the double seat valve.

One advantageous embodiment of the suggested method provides that the urging of the first seat cleaning flow up to into the inlet of the discharge bore is maintained. This particularly long and yet more far-reaching deflection and urging of the first seat cleaning flow leads to an even more improved fulfilling of the requirements of the standard as per [1]. Moreover, due to this handling of the first seat cleaning flow, in contrast to the generic double seat valve, as is further provided, the second seat cleaning flow also first experiences a deflection directed into the discharge bore. If the first seat cleaning flow is deflected and urged even further into the discharge bore, then the second seat cleaning flow, as provided by another suggestion, also experiences, in addition to the above deflection, an additional urging up to into the inlet of the discharge bore.

In the unscheduled event that a backing up of the seat cleaning flow in the narrowest passage cross-section of the discharge bore results, it is further suggested that the discharge bore forms in the area of its inlet a storage volume with a fill level, the hydrostatic pressure of which is sufficient in order to convey the volume flow of liquid of the respective seat cleaning flow at least through a minimal discharge cross-section of the discharge bore, which connects, as seen from the gravitational direction, to the fill level.

So that the aforementioned, unscheduled case of a backing up of the seat cleaning flows in the narrowest passage cross-section of the discharge bore cannot occur, another suggestion provides that the respective volume flows of liquid generated by the seat cleaning flows are restricted such that the volume flows discharge without backing up in the discharge bore through the latter into the area of the double seat valve.

According to the invention, the volume flow of liquid of the respective seat cleaning flow is restricted and/or deflected and fed such that, as a result of the ejector effect of the respective seat cleaning flow, the pressure on the leakage-space-side section of the seating of the other closing member remaining respectively in its closed position is equal to or less than the ambient pressure of the double seat valve, the atmospheric pressure. With the exception of the equality of the discussed pressures, this means that the respectively closed valve seat is suctioned so that a transfer of the cleaning liquid into the product itself in the case of a greatly damaged or entirely missing seat seal is excluded.

It is advantageous if the respective volume flows of liquid generated by the seat cleaning flows are restricted such that the volume flows are equal to each other. The volume flow of the first seat cleaning flow is thereby the limiting quantity for the suggested restriction, since the first seat cleaning flow is the most problematic and the most difficult to manage. This results from the undeniable fact that the first seat cleaning flow flows over the seating gap between the second closing member located in its closed position and an associated stop surface on the valve housing directly and diagonally to the seating gap so that an excess-pressure-generating stagnation pressure can overlie in this area of the negative-pressure-generating ejector effect of the first seat cleaning flow. The negative-pressure-generating ejector effect of the second seat cleaning flow is mainly free of stagnation-pressure-forming overlays.

The double seat valve for performing the method according to the invention is characterized by the following generally known characteristics:

the first closing member has on its first end section a first seal, which seals radially with respect to the first cylindrical seating formed in the connection opening;

the second closing member has a recess with a cylindrical circumferential wall on its second end section facing the first closing member, which is flush with the first cylindrical seating, wherein the recess is dimensioned to receive the first end section and the first radial seal of the first closing member in a sealing manner during the opening movement before the second closing member opens;

the second closing member can be transferred into its respective seat cleaning position through a second partial stroke directed in the same direction as the opening movement and the first closing member through a first partial stroke directed opposite the opening movement;

a cylindrical appendage, which forms the annular restrictor gap together with the associated connection opening, is arranged on the leakage space side on each end section;

the first seating has a diameter that is smaller than the diameter of an annular recess assigned to the second closing member in the connection opening and a transition area is provided between the first seating and the annular recess;

the second closing member lies in its closed position with a stop surface arranged on a front surface of its cylindrical second appendage on the transition area, and namely directly adjacent to the first seating;

On its end facing away from the first closing member, the circumferential wall passes into the deflection surface, the contour of which, as seen in the meridian cut, has a bend-free progression.

The fundamental inventive idea for the double seat valve for performing the method consists in that the deflection surface completely borders the remaining area of the recess not delimiting the circumferential wall and opens out from the latter at a front and radially inside end of the second closing member facing the first closing member.

Within the framework of the above general tenet, an advantageous embodiment suggests that the front and radially inside end of the second closing member is located within an imaginary space, which is delimited on its front side by a plane passing through the stop surface or is arranged in this plane. Another embodiment provides that the front and radially inside end of the second closing member, seen in the longitudinal axis of the double seat valve, reaches beyond the imaginary space, which is delimited on the front side by the plane passing through the stop surface. The advantages of the named embodiments were already described above in connection with the method according to the invention for cleaning the seat of a double seat valve.

The double seat valve according to the invention ensures in a preferred embodiment that the valve housing parts are designed according to the largest nominal passage cross-section of a tube conduit that can be connected to the latter and are interconnected via a seat ring forming the connection opening on the inside. A connection part of the tube shaft, which forms a section of the discharge bore on the inside, penetrates at least the connection opening during the full opening stroke of the double seat valve and is measured there radially on the outside such that the connection opening forms at its narrowest point an annular space with an annular space passage cross-section, which at least corresponds with the aforementioned largest nominal passage cross-section. This measurement instruction forcibly ensures that the annular space passage cross-section does not form a narrowing with respect to the nominal passage cross-section of the connectable tube conduit at any point. Since the valve housing parts in their nominal width are determined by the tube conduit to be connected and are thus not over-dimensioned from the start by one to two nominal widths, the outer diameter of the connection part and thus the radially inside section of the discharge bore are measured and reduced such that the annular space passage cross-section is realized in the required size.

Advantageously, the connection part, which remains, with its cross-section-reducing and thus generally undesired flow resistance generating effect, restricted to the just necessary linear dimension, is designed such that the discharge bore tapers from the leakage space side end of the first closing member in an inlet funnel in a conical manner and continuously up to the connection part and has in the latter on a delimited length an unchangeable, minimal discharge cross-section.

In order to reduce the flow resistance of the discharge bore, it is expanded, according to another suggestion, subsequent to the connection part in a section of the tube shaft designed as the first pressure compensating piston, wherein the pressure compensating piston has an outer diameter corresponding with the diameter of the cylindrical first seating or differing from it slightly on both sides.

In order to avoid an unscheduled backing up of the seat cleaning flows in front of the narrowest passage cross-section of the discharge bore, the connection part, it is provided that the inlet funnel with a volume of liquid backing up in it if applicable forms a fill level, the hydrostatic pressure of which is sufficient in order to convey the volume flow of liquid generated in the respective seat cleaning position at least through the minimal discharge cross-section of the connection part, which connects, as seen from the gravitational direction, to the fill level.

Different stresses on the seals of both closing members and different storage conditions and guiding conditions of the latter make it possible, as one suggestion provides, that a radial second gap width of the second restrictor gap is designed smaller than a radial first gap width of the first restrictor gap. This has a beneficial impact in this respect on the size calibration of the volume flows generated by the restrictor gap, since a constructively smaller gap length is available on the second restrictor gap than on the first restrictor gap, wherein, as is known, the gap length impacts the restriction only linearly and the radial gap width exponentially. It proved advantageous and productive when the relative radial gap widths of the first and the second restrictor gap act almost like 2:1, wherein the relative radial gap width is to be understood as the ratio between the absolute radial gap width and the average diameter, on which it is arranged.

With respect to the same flow conditions of the seat cleaning flows in the discharge bore, it is advantageous if the annular restrictor gap with its radial gap width and an associated length is designed such that the volume flows of liquid generated in the respective seat cleaning positions with the partial strokes by the associated seal cleaning flows are the same, wherein the volume flow of the first seat cleaning flow appropriately represents the limited size.

In the case of the flow guidance of the second seat cleaning flow generated by the ventilation of the second closing member, it is important that it detaches in a defined manner at a first circumferential edge formed by the transition area and the first seating and passes in a securely tangential and radially inwards manner by the surfaces bordering the first closing member in the area of the leakage cavity. For this purpose, a front-side delimitation of the first closing member facing the leakage cavity has an axial safety distance from the transition area, which prevents this type of impact under all possible technical conditions and also ensures an optimal ejector effect of the second seat cleaning flow in the seat area of the first closing member. Furthermore, it also proved beneficial with respect to an avoidance of any stagnation pressure formation if the first circumferential edge is rounded with the smallest possible first corner rounding. Ideally, a sharp-edged design would be provided here, which is however not permissible for technical and practical reasons (comprises the first seal).

According to another suggestion, the annular recess in the housing forms a perpendicular deflection angle (90 degrees) with the transition area, which most easily ensures a secure, collision-free flowing over of the first closing member by the second seat cleaning flow. The transition between the recess and the transition area is advantageously rounded with a rounding radius. An obtuse deflection angle (>90 degrees) can also be designed, wherein it introduces the second seat cleaning flow into the discharge bore in a more targeted manner, but can act in a stagnation-pressure-forming manner with respect to the first seat cleaning flow, because the flow direction of the first seat cleaning flow then matches a directional component of the transition area.

In order to avoid stagnation pressure formation during the entry of the first seat cleaning flow into the deflection surface in the second closing member, another suggestion provides that the circumferential wall forms a second circumferential edge with the stop surface, which is rounded with the smallest possible second corner rounding. A sharp-edged transition in this area is not permitted for technical and practical reasons; a relatively large rounding radius is counterproductive and leads to undesired stagnation pressure formation.

In terms of an optimal flow guidance of the first seat cleaning flow, the contour of the deflection surface consists of a sequence of bent sections, each of which have a common tangent at their transition points.

In order to avoid the eddy and stagnation pressure formation not only in the area of the seatings of the double seat valve described above, it is advantageous if all installations and obstacles in the rest of the leakage cavity are forgone if possible from a construction point of view. To this effect, a suggestion thus provides that a first adjusting rod connected with the first closing member penetrates concentrically a second adjusting rod connected with the second closing member and designed as a hollow rod, continues flying through the discharge bore and is permanently connected on an end of the first closing member facing away from the second closing member with the latter via at least one mainly radially oriented traverse. The stays normally used in the area of the leakage cavity and other connection means are thereby avoided and displaced to an end located relatively far away from the leakage cavity, where they can no longer have a disruptive impact on the flow guidance.

In order to reduce the flow resistance in particular in the cross-section-reduced area of the discharge bore, another suggestion provides that the first adjusting rod is reduced in cross-section at least in the axial extension area of the connection part, and namely to a cross-section-reduced valve rod area.

Since the end position limitation of the second closing member on the stop surface takes place in the area of the transition area and thus the permanent (metallic) stop surface needed up until now in the state of the art in the seat area of the second closing member is omitted, there is now a greater degree of freedom in the design of the second closing member in this seat area with respect to the known solutions. In principle, a purely radially, radially/axially and, conditionally possible, even a purely axially acting second seal can be provided in this area.

In this context, the invention provides according to a first embodiment that the second seating is designed cylindrically and is formed by the annular recess and that the second closing member has a second seal, which is sealed in sliding engagement radially with respect to the second seating.

A second embodiment concerning the second seating provides that the second seating is designed in a conical manner and that the second closing member has a second seal, which is sealed axially/radially in sliding/pressure engagement with respect to the second seating.

According to a third embodiment, it is suggested that the second seating is arranged perpendicular to the longitudinal axis of the double seat valve and that the second closing member has a second seal, which seals in pressure engagement axially with respect to the second seating. This type of solution with the advantages of a purely axially acting seal and of a purely axially acting seat plate is however only possible when the seal is created in a ductile manner such that the permanent and, if applicable, metallic attachment of the second closing member with its stop surface alone on the transition area is ensured under all conditions.

A sufficient restriction of the seat cleaning flows is a necessary prerequisite for the solution of the object according to the application. In order to increase the restrictor effect of the restrictor gap beyond the dimension achievable with measuring means for the radial gap width and the length or in order to achieve the same restrictor effect with a larger, radial gap width and/or a shorter gap length, another suggestion provides, wherein a turbulent flow is assumed in the respective restrictor gap, that the cylindrical appendage is designed on its circumferential surface delimiting the associated restrictor gap in the form of a labyrinth seal, the flow-mechanical effect of which is generally known. This can be achieved in that the labyrinth seal is designed in the form of a number of circumferential grooves. Another embodiment provides that the labyrinth seal is designed in the form a number of recesses that are not connected with each other, that are distributed over the circumferential surface of the cylindrical appendage and that are restricted in terms of their area at the respective location of their formation.

BRIEF DESCRIPTION OF THE SEVERAL VIEWS OF THE DRAWINGS

A more detailed representation of the invention results from the following description and the attached figures of the drawing as well as from the claims. While the invention is realized in the different embodiments of a method for cleaning the seat of a double seat valve and a double seat valve for performing the method, a method and a double seat valve are described in a preferred embodiment based on the drawing. They show:

DETAILED DESCRIPTION OF THE INVENTION

Figure 1:
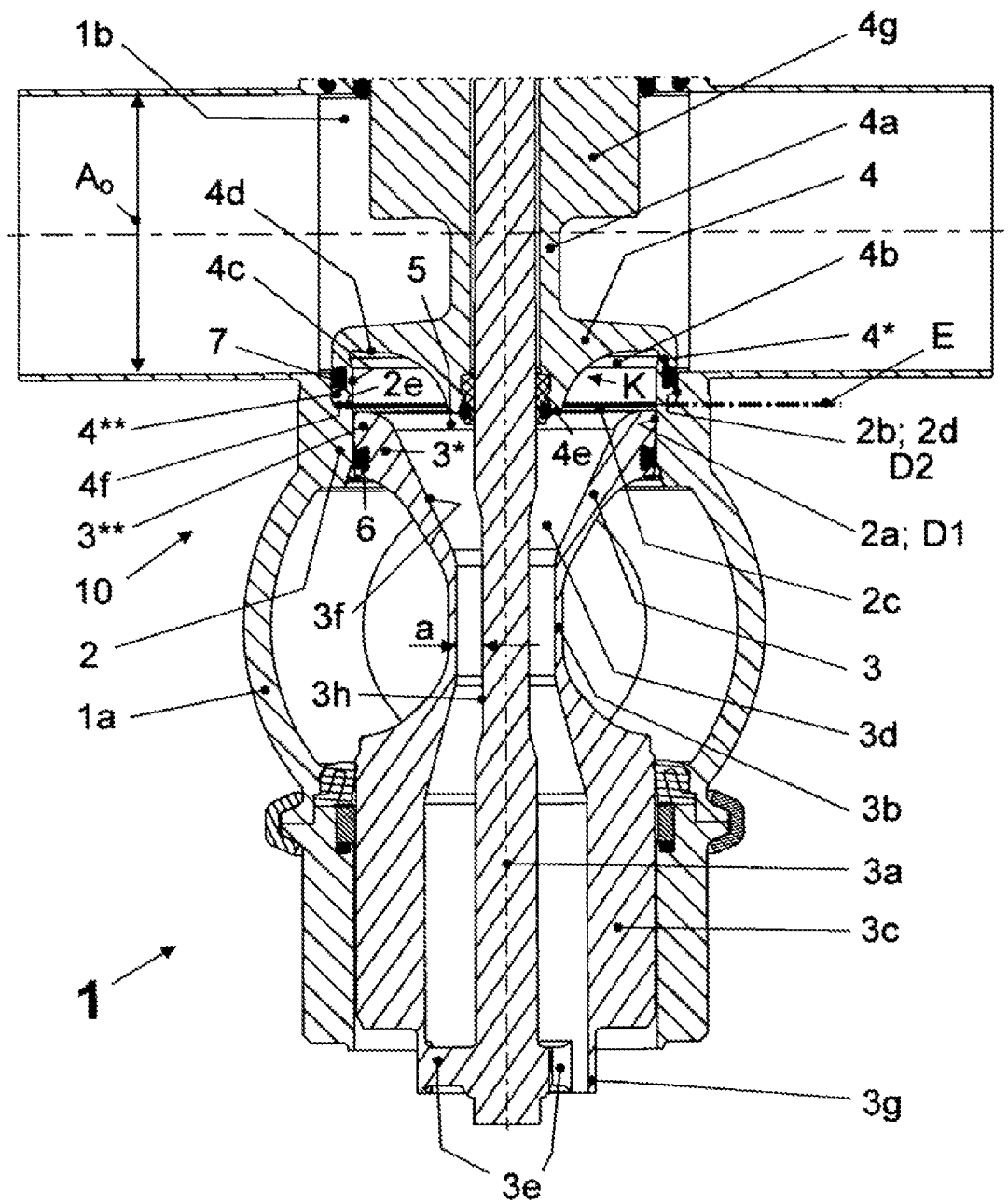
FIG. 1 in a meridian cut, the seat-cleaning-capable double seat valve according to the invention without drive, wherein the closed position of the double seat valve is shown.

While this invention may be embodied in many different forms, there are described in detail herein a specific preferred embodiment of the invention. This description is an exemplification of the principles of the invention and is not intended to limit the invention to the particular embodiment illustrated.

The double seat valve 1 according to the invention (FIGS. 1, 1a) mainly consists of the valve housing 10 with a first and a second valve housing part 1a or respectively 1b, the two independently moveable closing members 3 and 4 with the respectively associated adjusting rods 3a or respectively 4a and a seat ring 2, which establishes a connection between the valve housing parts 1a, 1b via an inside connection opening 2c.

The first closing member 3 (active closing member) designed as a pusher piston is received in a sealing manner in the closed position of the double seat valve 1 in a first seating 2a formed by the connection opening 2c, which is designed as a cylindrical seating. For this, a first seal 6, which works with the first seating 2a exclusively through radial pre-stressing, is provided in the pusher piston 3 (radial seal in sliding engagement). The second closing member 4 also designed as a pusher piston works together in a sealing manner with a second seating 2b also formed by the connection opening 2c in the closed position of the double seat valve 1, which is designed cylindrically and which is formed by a mainly cylindrical annular recess 2d in the connection opening 2c. The sealing takes place via a second seal 7, which works together with the second seating 2b exclusively through radial pre-stressing (radial seal in sliding engagement).

Figure 2:
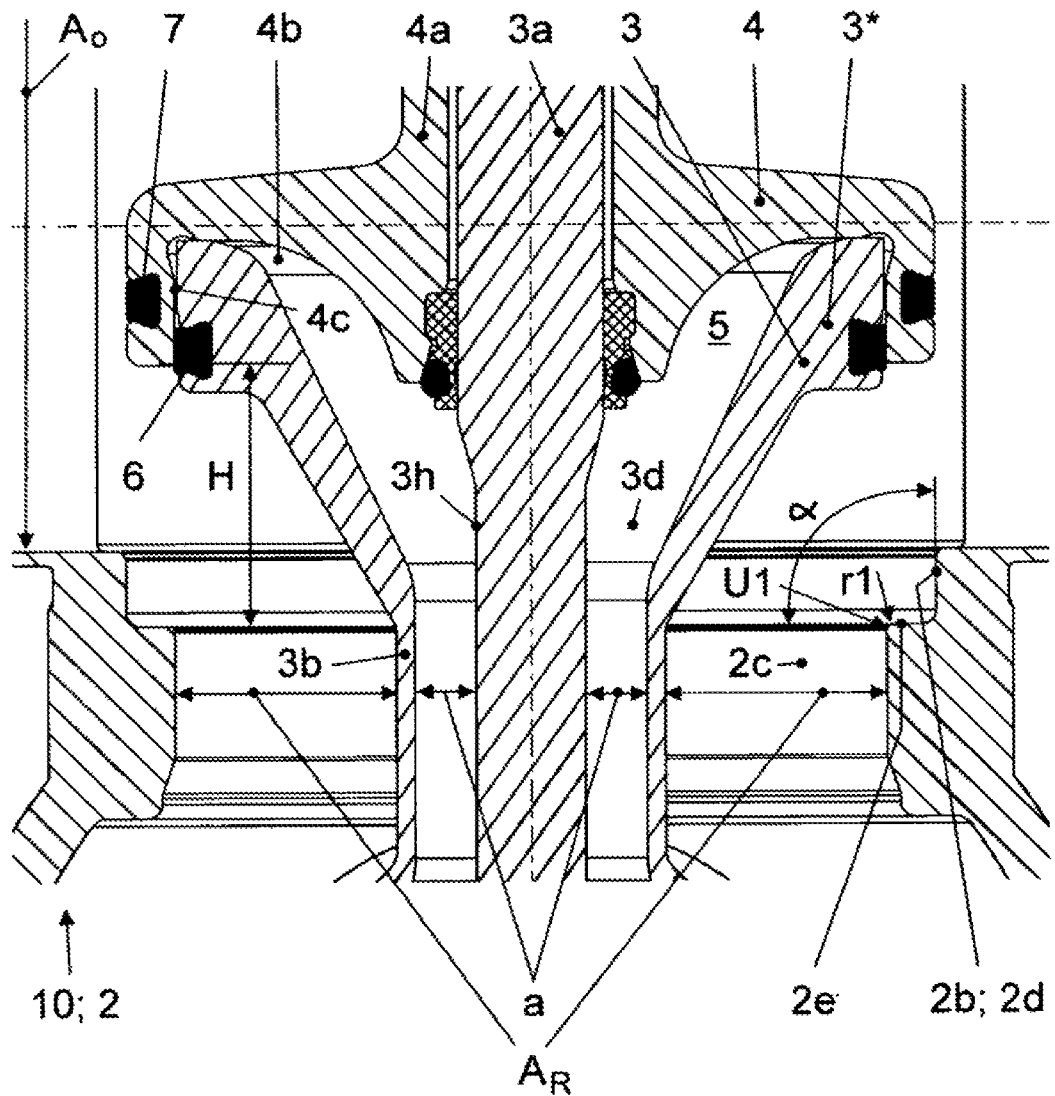
FIG. 2 in a meridian cut, the double seat valve according to FIG. 1a, wherein the open position of the double seat valve is shown.
Figure 3:
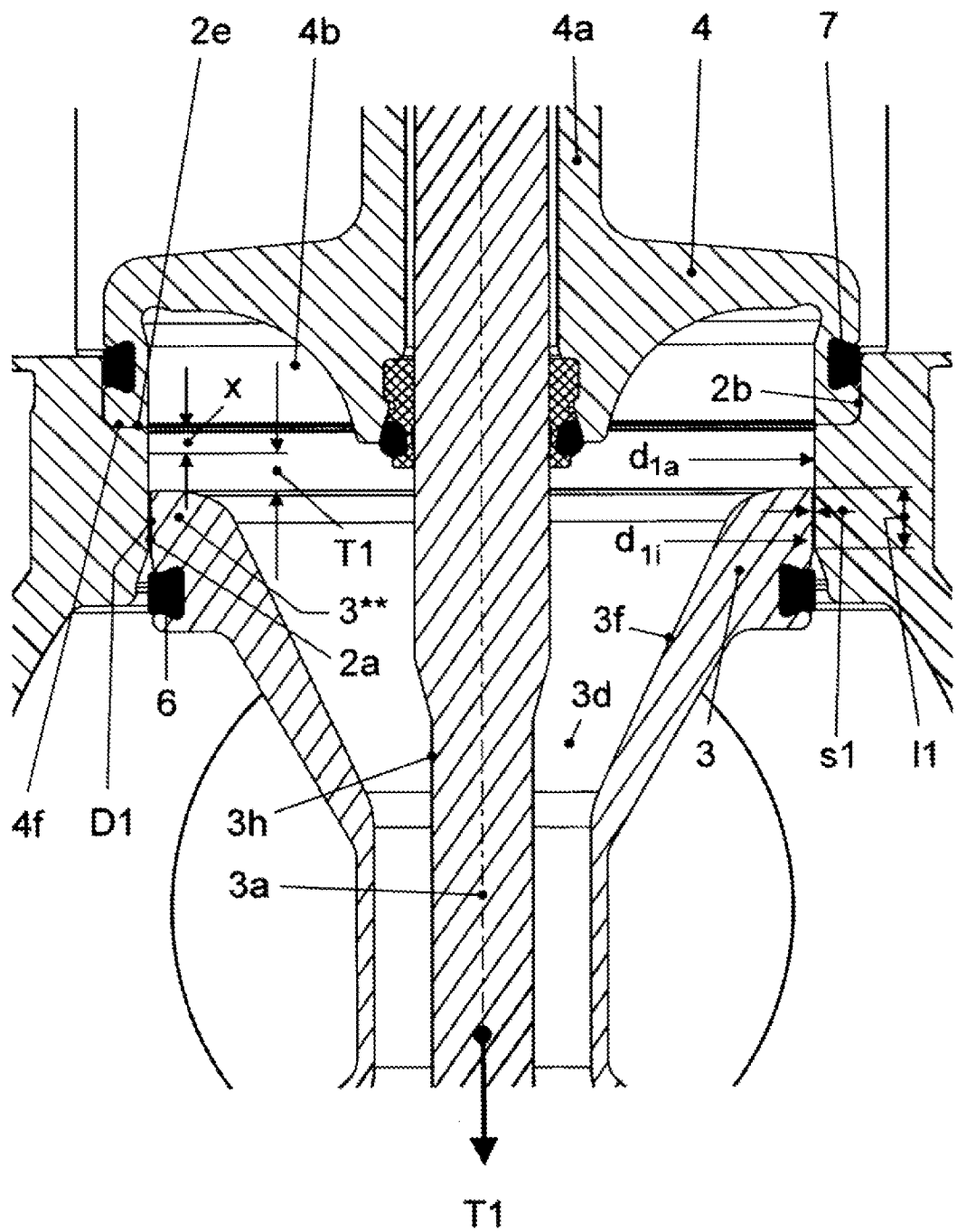
FIG. 3 in a meridian cut, the double seat valve according to FIG. 1a, wherein the independently driven, lower-lying, first closing member designed as a pusher piston is located in its seat cleaning position.
Figure 3A:
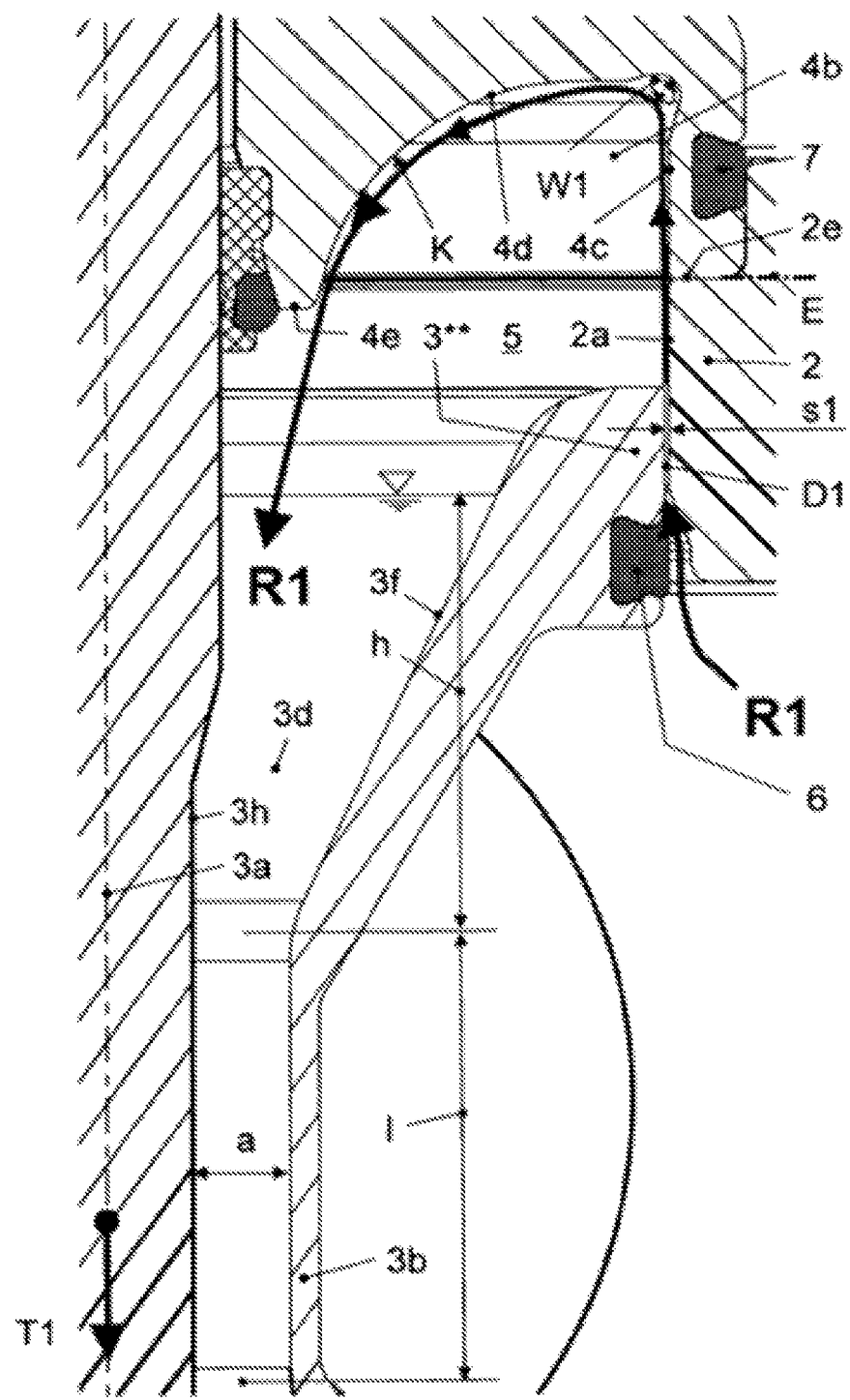
FIG. 3a in a meridian and detail cut, an enlarged representation of the seat areas of the double seat valve according to FIG. 3, wherein the progression of the first seat cleaning flow is now shown.

The two closing members 3, 4 form both in the shown closing as well as in an open position (FIG. 2) amongst themselves a leakage cavity 5, which is connected with the area surrounding the double seat valve 1 via a discharge bore 3d, which is bordered by a tube shaft designed on the first closing member 3 and guided out of the first valve housing part 1a into the area surrounding the double seat valve 1. The discharge bore 3d overall is delimited radially outside, beginning from the leakage cavity 5, by an inlet funnel 3f, a connecting connection part 3b and a pressure compensating piston 3c continuing on the latter, wherein the latter preferably has an outer diameter corresponding or almost corresponding with the first seating 2a. The discharge bore 3d penetrates the tube shaft preferably concentrically and it tapers from the leakage-space-side end of the first closing member 3 in the inlet funnel 3f in a conical manner and continuously up to the connection part 3b and has in the latter an unchanged, minimal discharge cross-section a on a restricted length l (FIGS. 2, 3a).

The valve housing parts 1a, 1b are designed according to the greatest nominal passage cross-section $A_O$ of a tube conduit that can be connected to the latter (FIG. 2) and interconnected via the seat ring 2 forming the connection opening 2c on the inside. The connection part 3b of the tube shaft, which forms a section of the discharge bore 3d on the inside, penetrates at least the connection opening 2c during the full opening stroke H of the double seat valve 1 and is measured there radially on the outside such that the connection opening 2c at its narrowest point forms an annular space with an annular space passage cross-section $A_R$, which at least corresponds with the nominal passage cross-section $A_O$ ($A_R \geq A_O$).

The first adjusting rod 3a connected with the first closing member 3 penetrates concentrically the second adjusting rod 4a that is connected with the second closing member 4, that is designed as a hollow rod and that is designed in the penetration area with the second valve housing part 1b as a second pressure compensating piston 4g (FIG. 1), continues flying through the discharge bore 3d and is permanently connected with the first closing member 3 via at least one mainly radially oriented traverse 3e on an end of the first closing member 3 which is designed as ring 3g facing away from the second closing member 4. The first adjusting rod 3a is reduced in cross-section preferably at least in the axial in the axial extension area of the connection part 3b for reducing the flow resistance and namely to a cross-section-reduced valve rod area 3h. Due to the traverses 3e arranged far from the leakage cavity 5, the inlet funnel 3f remains free of flow barriers in the case of this preferred embodiment and negative repercussions on the flow conditions and the flow pattern in the leakage cavity 5 are avoided.

Figure 4:
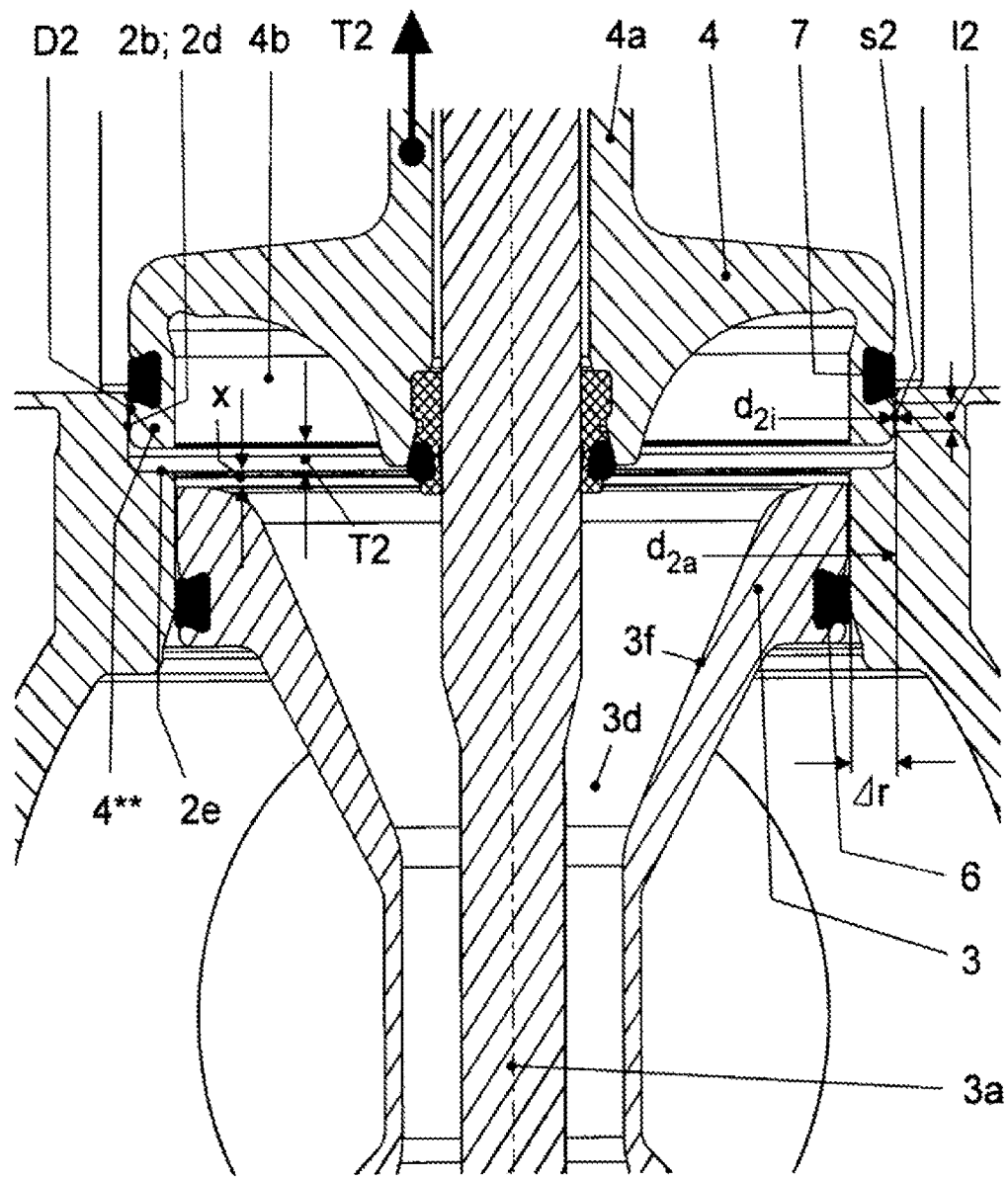
FIG. 4 in a meridian cut, the double seat valve according to FIG. 1a, wherein the dependently driven, upper-lying, second closing member also designed as a pusher piston is located in its seat cleaning position.
Figure 4A:
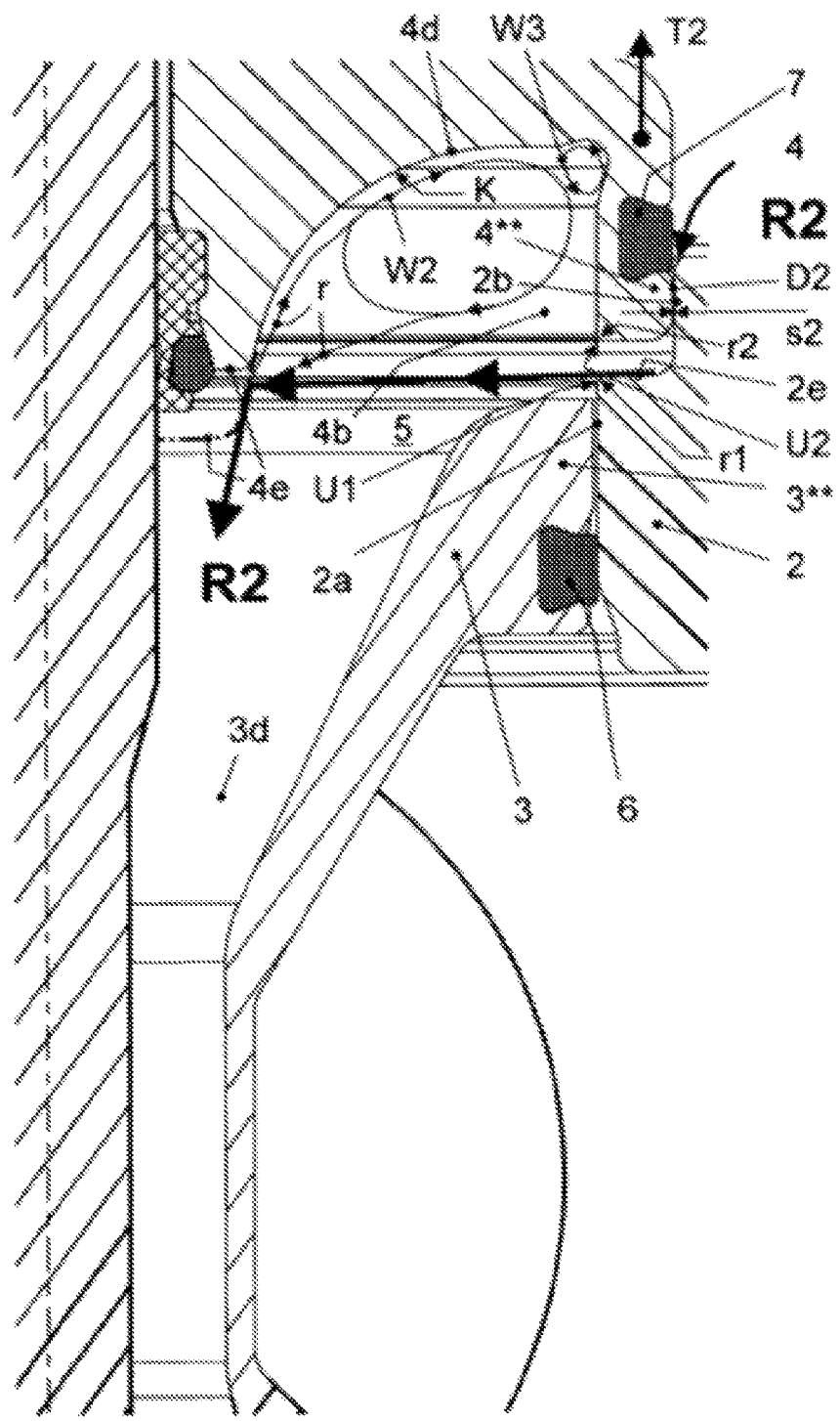
FIG. 4a in a meridian and detail cut, an enlarged representation of the seat areas of the double seat valve according to FIG. 4, wherein the progression of the second seat cleaning flow is shown.

Each closing member 3, 4 has on its leakage-space-side end section 3* or respectively 4* a cylindrical appendage 3 or respectively 4, wherein the latter with the associated part of the connection opening 2c in the seat ring 2 forms an annular first restrictor gap D1 (also see FIGS. 1, 3, 3a) or respectively an annular second restrictor gap D2 (also see FIGS. 1, 4, 4a).

The second closing member 4 has on its end facing the first closing member 3 a recess 4b with a mainly cylindrical circumferential wall 4c that is mainly flush with the cylindrical first seating 2a (FIGS. 1 to 4b). This circumferential wall 4c is thereby dimensioned such that it receives in a sealing manner the first end section 3* and the radial first seal 6 of the first closing member 3 during the opening movement before the second closing member 4 opens.

In connection with FIG. 1, FIGS. 2 to 4b clarify details of the seat area for the double seat valve 1. The first closing member 3 forms the first restrictor gap D1 with its cylindrical first appendage 3 (FIG. 3), which has a first closing member diameter $d_{1i}$, and with the associated first seating 2a of the connection opening 2c, which has a first seat diameter $d_{1a}$. The first radial gap width s1 is formed between the two diameters $d_{1a}$ and $d_{1i}$, on a first restrictor gap length l1. The second closing member 4 forms the second restrictor gap D2 in the same manner with its cylindrical second appendage 4 (FIG. 4), which has a second closing member diameter $d_{2i}$, and with the cylindrical annular recess 2d in the connection opening 2c, which simultaneously forms the cylindrical second seating 2b with a second seat diameter $d_{2a}$. The radial second gap width s2 is formed between the two diameters $d_{2a}$ and $d_{2i}$ on a second restrictor gap length l2.

Half the diameter difference between the second seating 2b and the first seating 2a (FIGS. 3, 4) forms a radial extension area $\Delta r = (d_{2a} - d_{1a})/2$. A transition area 2e is provided in the latter between the first seating 2a and the second seating 2b, wherein at least the end section of the transition area 2e opening into the first seating 2a with the cylindrical shell surface of the second seating 2b forms a perpendicular deflection angle α (FIG. 2). The second seating 2b or respectively the annular recess 2d in the connections opening 2c thereby has a rounded transition to the transition area 2e designed with a rounding radius, wherein the rounding radius is smaller than the radial extension area Δr. The radial extension area Δr is designed large enough that a second seat cleaning flow R2 (FIGS. 4a, 4b) in the seat cleaning position of the second closing member 4 escaping from the second restrictor gap D2 into the leakage cavity 5 is diverted past the transition area 2e to the center of the leakage space 5 and securely over the first closing member 3. In order to ensure that the second seat cleaning flow R2 is not diverted prematurely in the direction of the first closing member 3, a first circumferential edge U1 formed by the transition area 2e and the first seating 2a is rounded with the smallest possible first corner rounding r1, whereby a defined flow break point is created at this point (FIGS. 2 and 4a).

Through this measure, it is furthermore ensured that the second seat cleaning flow R2 leaving the second restrictor gap D2 is not directed at the seat area of the first seal 6. Moreover, the radial extension area Δr of the transition area 2e must also ensure the realization of a valve-housing-side stop surface (FIGS. 1, 1a, 2) for the second closing member 4, so that a permanent (metallic) stop of the second closing member 4 located directly next to the leakage cavity 5 is realized on the seat ring 2. The valve-housing-side stop surface or respectively transition area 2e corresponds with a stop surface 4f provided on the front side of the cylindrical second appendage 4**. The valve-housing-side stop surface 2e and the closing-member-side stop surface 4f are respectively designed straight and according to the deflection angle α at a right angle to the longitudinal axis of the double seat valve 1 (α=90 degrees).

The circumferential wall 4c of the cylindrical recess 4b in the second closing member 4 merges into a rotation-symmetrical deflection surface 4d on its end facing away from the first closing member 3 (FIGS. 1 to 4b), and the latter borders the remaining area of the recess 4b not delimited by the circumferential wall 4c in its entirety and first opens out from the latter at a front and radially inside end 4e of the second closing member 4 facing the first closing member 3. It is thereby particularly advantageous if the deflection surface 4d is guided in a very far-reaching manner radially inward and axially to the first closing member 3 and namely up to an outermost end delimiting the second closing member 4.

For the positioning of the front and radially inside end 4e, which in terms of the above space-forming definition of the recess 4b should not be considered a restricted area of the same, the following two embodiments are suggested. The first embodiment, which is not shown in FIGS. 1 to 4b, provides that the front and radially inside end 4e is located within an imaginary space, which is delimited on the front side by a plane E passing through the stop surface 4f or is arranged in this plane E. The end 4e thereby remains within the second closing member 4 and does not protrude in the axial direction over the delimitation given by the stop surface 4f or respectively plane E. In the case of the second embodiment (FIGS. 1 to 4b), the front and radially inside end 4e of the second closing member 4, seen in the longitudinal axis of the double seat valve 1, protrudes over the imaginary space, which is delimited on the front side by plane E passing through the stop surface 4f. The FIGS. 4a (solid line, dashed and dotted line) and 4b show an example of the different dimension of this protrusion under the above conditions. The consequences for the second seat cleaning flow R2 in this regard will be covered below.

Figure 1A:
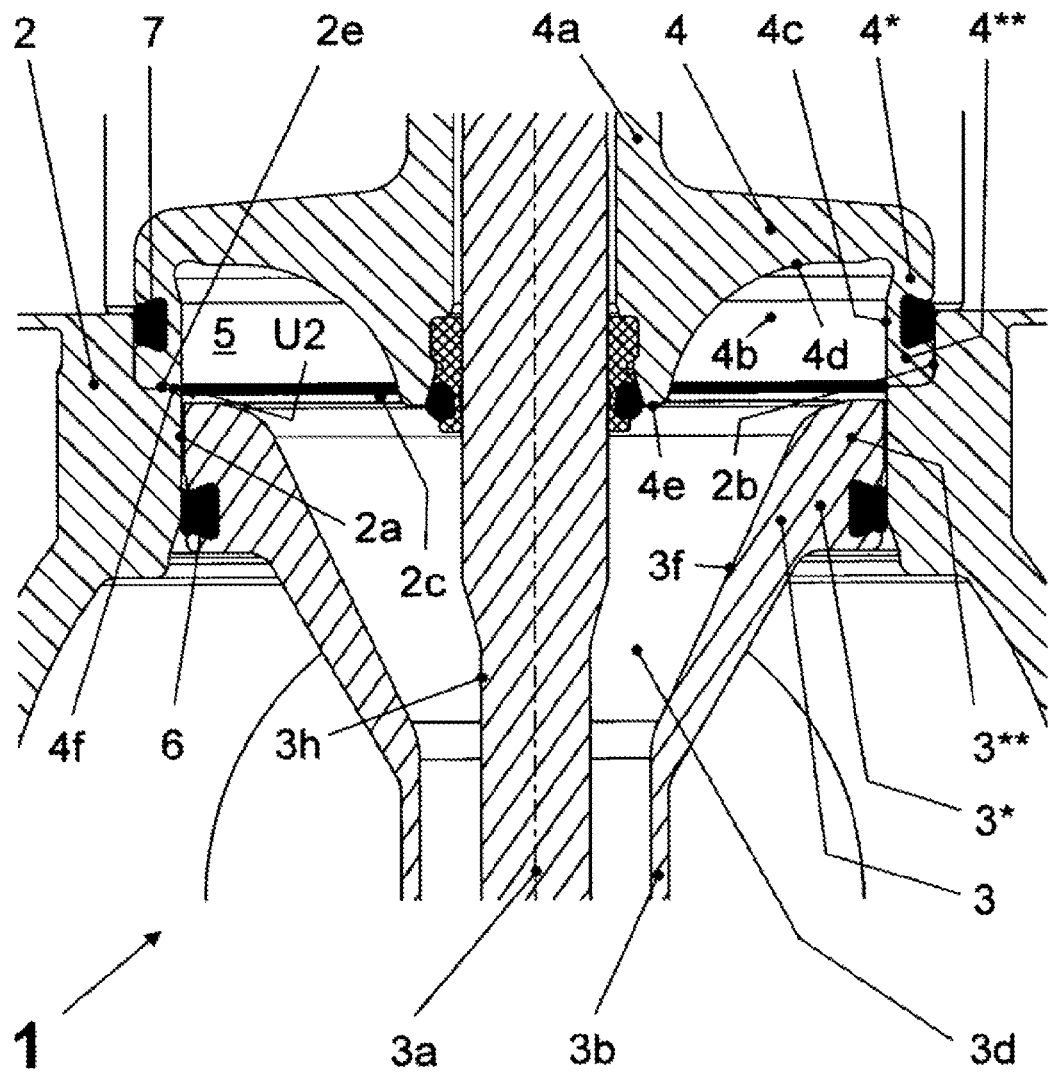
FIG. 1a in a meridian cut, an enlarged representation of the seat area of the double seat valve according to FIG. 1.

A second circumferential edge U2 formed by the circumferential wall 4c and the stop surface 4f, which is rounded with a smallest possible second corner rounding r2 (FIG. 4a) is directly adjacent to the first seating 2a in the closed position of the second closing member 4 (FIG. 1a). Seen in the meridian cut, the deflection surface 4d has a contour K with bend-free progression, wherein it preferably consists of a sequence of bent sections (e.g. arcs, ellipses, parabolas, hyperbolas), each of which have a common tangent at their transition points. It is visible from the direction of a first seat cleaning flow R1 (FIG. 3a) in the area of the front and radially inside end 4e under which directional vector the deflection surface 4d opens out from the second closing member 4 and it also visible that, with the deflection surface 4d designed according to the invention, the first seat cleaning flow R1 is diverted in a very targeted and bumpless manner into the discharge bore 3d and urged on a longest possible flow path in the second closing member 4. A collision of the first seat cleaning flow R1 with the areas bordering the leakage cavity 5 does not occur at any position.

A front-side delimitation of the first closing member 3 facing the leakage cavity 5 has in its closed position an axial safety distance x from the transition area 2e (FIG. 4), wherein this safety distance x prevents for one a collision of the first closing member 3 with the second seat cleaning flow R2 (FIGS. 4a, 4b) and on the other hand ensures a sufficient ejector effect of the second seat cleaning flow R2 in the seat area of the first closing member 3.

In the open position of the double seat valve 1 (FIG. 2), when the full opening stroke H is realized, it becomes clear that the first seal 6 radially acting on the circumferential wall 4c of the recess 4b ensures a secure sealing of the two closing members 3, 4 between the valve housing 10 on one side and the leakage cavity 5 on the other side.

The first seat cleaning flow R1 leaving the first restrictor gap D1 (FIGS. 3a, 3) in the course of the seating cleaning of the first closing member 3 after execution of a first partial stroke T1 first flows along the first seating 2a, bridges the contact gap between the transition area 2e and the stop surface 4f without disconnecting, follows the circumferential wall 4c, flattens in a flow technical manner a transition area in the deflection surface 4d serving to receive the corner area of the cylindrical first appendage 3** (also see FIG. 2) and is urged through the further progression of the deflection surface 4d radially inward and axially to the first closing member 3 up until the exit of the second closing member 4 on the front and radially inside end 4e of the second closing member 4 located outside the recess 4b and finally arrives right on target in the entry area of the discharge bore 3d. A first eddy flow W1 formed in the aforementioned transition area has no negative impacts on the flow and pressure conditions in the leakage cavity 5. The undercut shown in FIG. 3a in the aforementioned transition area can be easily omitted if a suitable rounding is performed on the first closing member 3. The deflection surface 4d then receives in the discussed transition area the progression of the first seat cleaning flow R1 shown in FIG. 3a. The leakage-space-side end of the second restrictor gap D2 shown in FIG. 4 is sealed as tightly as possible on the valve-housing-side stop surface 2e by the stop position (see FIG. 3a) of the second closing member 4. Cleaning liquid of the first seat cleaning flow R1 cannot enter the second restrictor gap D2 and thus the area of the second seal 7. Even in the case of a heavily damaged or, if applicable, entirely removed second seal 7, there is thus no longer a passage for cleaning liquid, especially since the discussed contact gap is suctioned through the ejector effect of the first seat cleaning flow R1.

Figure 4B:
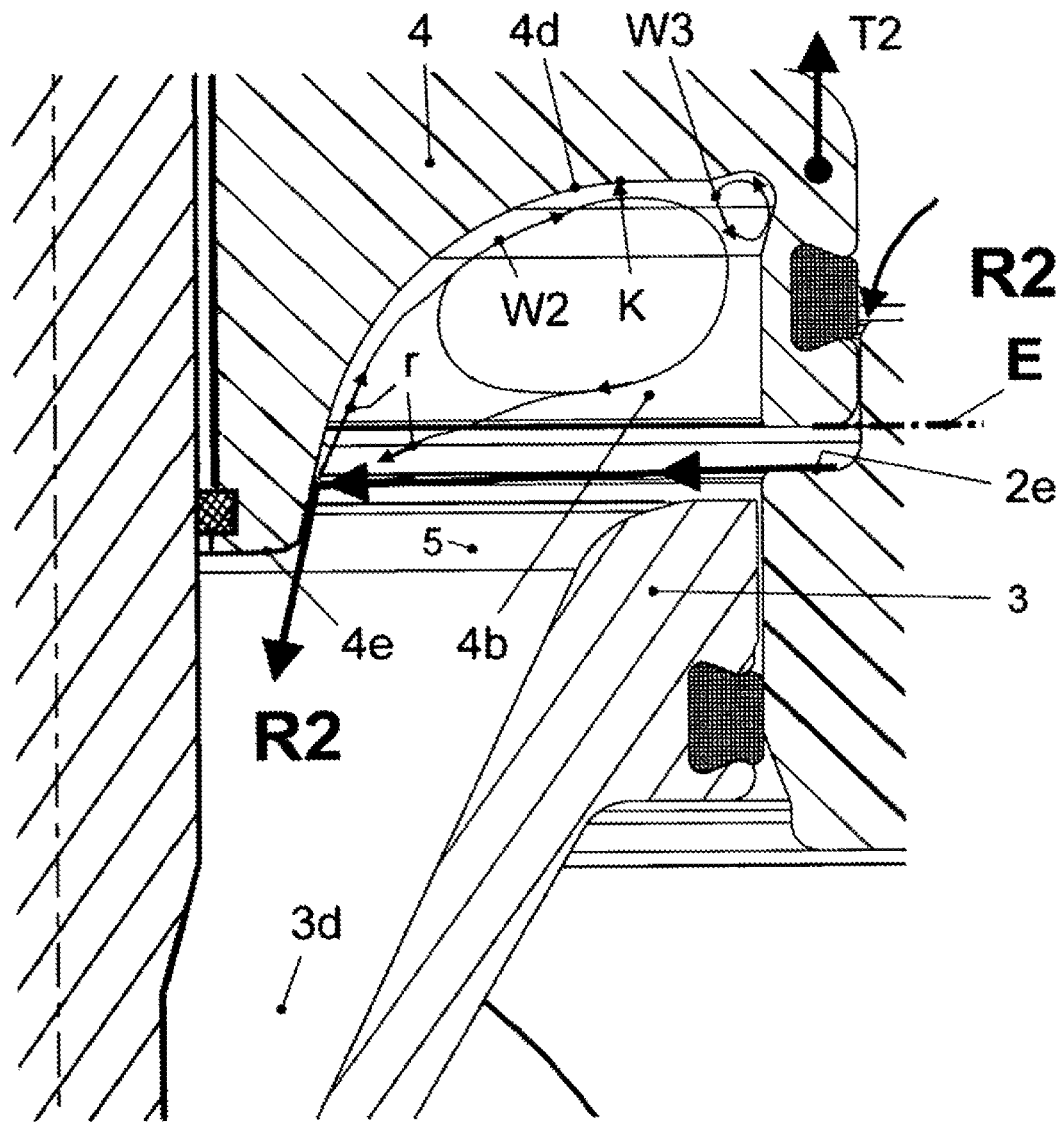
FIG. 4b in a meridian and detail cut, an enlarged representation of the seat areas of the double seat valve according to FIG. 4, wherein the deflection surface is modified with respect to the design according to FIG. 4a and the thereby resulting progression of the second seat cleaning flow is shown.

According to FIGS. 4a, 4b and 4, the second closing member 4 assumes its second seat cleaning position after execution of a second partial stroke T2. The second seal 7 thereby leaves the second seating 2b under formation of an entry gap and the cylindrical second appendage 4 forms the second restrictor gap D2 together with the second seating 2b or respectively the annular recess 2d, through which the second seat cleaning flow R2 can be advanced to the now overflowable, open second seating 2b and can be introduced into the leakage cavity 5. The second seating 2b is designed cylindrically, wherein it is formed directly by the annular recess 2d. This embodiment ensures in a special manner that the second closing member 4 in its closed position with the stop surface 4f arranged on the front side of its cylindrical second appendage 4 is solely adjacent to the transition area 2e.

The double seat valve 1 according to the invention can also be designed with a second conical seating 2b (not shown in the figures), wherein the latter connects upwards to the cylindrical annular recess 2d. The second seal 7 seals axially/radially with respect to the second seating 2b. The double seat valve 1 according to the invention also permits an embodiment (also not shown in the figures) of the second seating 2b perpendicular to the longitudinal axis of the double seat valve 1, wherein the second seal 7 arranged in the second closing member 4 seals axially with respect to this second seating 2b in a pure pressure engagement. However, this solution is only possible if the axially acting second seal 7 is ductile enough that the stop position of the second closing member 4 continues to be ensured on the valve-housing-side transition area 2e leaving in the area of the first seating 2a.

The second seat cleaning flow R2 leaves the second restrictor gap D2 (FIGS. 4a, 4b) first along the annular recess 2d and is deflected over the transition area 2e towards the center of the leakage cavity 5. An immediate and direct spraying of the seat area of the first seal 6 is thereby securely prevented. In the case of the seat cleaning of the second closing member 4, the first closing member 3 is positioned away from the transition area 2e by the safety distance x in the axial direction (FIG. 4) so that the second seat cleaning flow R2 can flow unhindered over and past the first closing member 3. Depending on the given pressure conditions and under the influence of gravity during the arrangement of the double seat valve 1 according the drawing position, the liquid jet assumes a slightly parabolic progression (not shown) so that the second seat cleaning flow R2 arrives on target in the discharge bore 3d. Through this flow guidance and positioning of the first closing member 3, a suctioning of the seat area of the first seal 6 is achieved so that no cleaning agent can get into the first neighboring valve housing part 1a even in the case of loss of or significant damage to the first seal 6. The first circumferential edge U1 formed by the transition area 2e and the first seating 2a, which is rounded with the smallest possible corner rounding r1, favors a dissolution of the seat cleaning flow R2 at the first circumferential edge U1 and thus prevents a stagnation-pressure-forming approach flow of the annular gap leading to the first seal 6 through this seat cleaning flow R2 or through a partial flow of the same.

The FIGS. 4a, 4b each show flow conditions, which arise when the second seat cleaning flow R2 in the area above the front and radially inside end 4e of the deflection surface 4d introduced into the entry of the discharge bore 3d hits the deflection surface 4d. In this case, the second seat cleaning flow R2 experiences at least one deflection directed into the discharge bore 3d through the deflection surface 4d and, in the case of sufficient distance of the point of impact from the end 4e, also an urging up to far into the entry of the discharge bore 3d. At the point of impact, a partial flow r branches up from the second seat cleaning flow R2 directed upwards into the recess 4b, which there forms a second eddy flow W2 flowing along the deflection surface 4d and, in the undercut of the transition area between the circumferential wall 4c and the deflection surface 4d, a third counter-rotating eddy flow W3. The partial flow r fed back into the second seat cleaning flow R2 is fed out of the second eddy flow W2. Both eddy flows W2, W3 ensure sufficient cleaning of the surfaces bordering the recess 4b without leading to a stagnation pressure formation or a direct approach flow of the first seating 2a.

The present invention bestows particular attention to the restriction of the respective seat cleaning flow R1, R2. The respective volume flow of liquid of the seat cleaning flow R1, R2 is technically restricted and/or deflected and guided such that the pressure on the leakage-space-side section of the seating 2b, 2a of the other closing member 4, 3 respectively remaining in its closed position is less than or equal to the ambient pressure or respectively the atmospheric pressure of the double seat valve 1. It is thereby attempted to restrict the volume flows of liquid generated by the seat cleaning flows R1, R2 such that the volume flows are equal to each other. Moreover, the volume flows through the above restriction are measured such that they run through the discharge bore 3d into the area surrounding the double seat valve 1 without backing up in the discharge bore 3d.

However, should there be a backup in the minimal discharge cross-section a of the discharge bore 3d, then the discharge bore 3d can form a storage volume with a fill level h in the area of its entry (FIG. 3a), the hydrostatic pressure $\Delta p_{hydr}$ of which is sufficient in order to convey the volume flow of liquid of the respective seat cleaning flow R1, R2 at least through a minimal discharge cross-section a, which connects, as seen from the gravitational direction, to the fill level h. The storage volume with the fill level h is preferably formed by the inside of the inlet funnel 3f.

The first restrictor gap D1 (FIG. 3) is formed by the radial first gap width s1 and the first restrictor gap length l1 and the second restrictor gap D2 (FIG. 4) by the radial second gap width s2 and the second restrictor gap length l2. A preferred design of the restrictor gap D1, D2 provides that the second radial gap width s2 of the second restrictor gap D2 is smaller than the radial first gap width s1 of the first restrictor gap D1. A quantitative measuring instruction to this effect proved valuable, according to which the relative radial gaps widths of the restrictor gaps D1, D2 defined above act almost like 2:1. In this connection, the following applies to the relative radial gap width of the first restrictor gap D1 (FIG. 3) as per equation (1)

$$s1/[(d_{1i}+d_{1a})/2] \qquad (1)$$

and for the relative radial gap width of the second restrictor gap D2 (FIG. 4) as per equation (2)

$$s2/[(d_{2i}+d_{2a})/2], \qquad (2)$$

wherein the restrictor gap D1, D2 is advantageously designed as per equation (3) with $$\frac{\frac{s1}{\frac{d_{1i}+d_{1a}}{2}}}{\frac{s2}{\frac{d_{2i}+d_{2a}}{2}}} \approx \frac{2}{1} \qquad (3)$$

The respective restrictor effect of the annular restrictor gap D1, D2 is determined, in addition to its radial gap width s1, s2, which acts respectively exponentially, by the associated length l1, l2, which takes respectively a linear impact. These parameters can be designed and coordinated under the aforementioned conditions such that the volume flows of liquid generated by the associated seat cleaning flows R1, R2 in the respective seat cleaning positions with the partial strokes T1, T2 are the same.

This completes the description of the preferred and alternate embodiments of the invention. Those skilled in the art may recognize other equivalents to the specific embodiment described herein which equivalents are intended to be encompassed by the claims attached hereto.

REFERENCE LIST OF THE ABBREVIATIONS

1 Double seat valve
10 Valve housing
1a First valve housing part
1b Second valve housing part
2 Seat ring
2a First seating (cylindrical seating)
2b Second seating (axial; radial; axial/radial)
2c Connection opening
2d Annular recess
2e Transition area
3 First closing member (pusher piston)
3* First end section
3** Cylindrical first appendage
3a First adjusting rod
3b Connection part
3c First pressure compensating piston
3d Discharge bore
3f Conical inlet funnel
3e Traverse
3g Ring
3h Cross-section-reduced valve rod area
4 Second closing member
4* Second end section
4** Cylindrical second appendage
4a Second adjusting rod
4b Recess
4c Circumferential wall
4d Deflection surface
4e Front and radially inside end (of the second closing member 4)
4f Stop surface (closing member side)
4g Second pressure compensating piston
5 Leakage cavity
6 First seal (radial)
7 Second seal (axial; radial; axial/radial)
a Minimal discharge cross-section
$d_{1a}$ First seat diameter
$d_{1i}$ Second closing member diameter
$d_{2a}$ Second seat diameter
$d_{2i}$ Second closing member diameter
h Fill level
l Length (of the minimal discharge cross-section a)
l1 First restrictor gap length
l2 Second restrictor gap length
$\Delta p_{hydr}$ Hydrostatic pressure
 ($\Delta p_{hydr}=\rho$ g h; density $\rho$ of the cleaning liquid; gravity acceleration g)
r Partial flow (from second seat cleaning flow R2)
$\Delta r$ Radial extension area ($\Delta r=d_{2a}-d_{1a}$)
r1 First corner rounding (housing side; seat ring 2)
r2 Second corner rounding (second closing member 4)
s1 Radial first gap width (first restrictor gap D1)
s2 Radial second gap width (second restrictor gap D1)
x Axial safety distance
α Deflection angle
$A_O$ Nominal passage cross-section
$A_R$ Annular space passage cross-section
D1 First restrictor gap
D2 Second restrictor gap
E Plane (as geometric location of the stop surface 4f)
H Full opening stroke (full open position)
K Contour of the deflection surface
R1 First seat cleaning flow
R2 Second seat cleaning flow
T1 First partial stroke (first partial open position/first seat cleaning position)
T2 Second partial stroke (second partial open position/second seat cleaning position)
U1 First circumferential edge
U2 Second circumferential edge
W1 First eddy flow
W2 Second eddy flow
W3 Third eddy flow

The invention claimed is:

1. A method for cleaning the seat of a double seat valve, which has two closing members (3, 4) arranged in series and moveable relative to each other, which prevent in the closed position of the double seat valve (1) overflowing of fluid from a valve housing part (1a; 1b) of a valve housing (10) into another valve housing part (1b; 1a), which delimit between each other both in the closed as well as in the open position a leakage cavity (5), which is connected with an area surrounding the double seat valve (1) via a discharge bore (3d), which is bordered by a tube shaft designed on the first closing member (3) and fed out of the valve housing (10), wherein, in the closed position, the first closing member (3) designed as a pusher piston is received in a sealing manner in a connection opening (2c) interconnecting the valve housing parts (1a, 1b) and forming a first seating (2a) and, in the course of its opening movement comes to rest in a sealing manner in or on a second closing member (4), which is assigned to a second seating (2b), and the second closing member (4) is also transferred to an open position (H) during the further opening movement, rinsing the seatings (2a, 2b) when the closing members (3, 4) are transferrable independently of each other through a partial stroke (T1, T2) respectively gap wide into a seat cleaning position, generating a seat cleaning flow (R1, R2) in the respective seat cleaning position experiences a restriction in a restrictor gap (D1, D2) arranged on the leakage cavity side on the associated closing member (3, 4) before it enters the leakage cavity (5) and wherein the first seat cleaning flow (R1) generated by the first closing member (4) experiences a bumpless deflection directed into the discharge bore (3d) on a rotationally symmetrical deflection surface (4d), which is designed in a radially outside part of a recess (4b) in the second closing member (4), wherein urging the first seat cleaning flow (R1) through the deflection surface (4d) radially inward and axially to the first closing member (3) up until the exit of the second closing member (4) on a front and radially inside end (4e) of the second closing member (4) located outside the recess (4b).

2. The method according to claim 1, wherein the urging of the first seat cleaning flow (R1) is maintained up to into the entry of the discharge bore (3d).

3. The method according to claim 1, wherein the second seat cleaning flow (R2) experiences a deflection by the deflection surface (4d) directed into the discharge bore (3d).

4. The method according to claim 3, wherein the second seat cleaning flow (R2) also experiences an urging up to into entry of the discharge bore (3d) by the deflection surface (4d).

5. The method according to claim 1, wherein the discharge bore (3d) in the area of its entry forms a storage volume with a fill level (h), the hydrostatic pressure ($\Delta p_{hydr}$) of which is sufficient in order to convey the respective volume flow of liquid of the respective seat cleaning flow (R1, R2) at least through a minimal discharge cross-section (a) of the discharge bore (3d), the minimal discharge cross-section connecting, as seen from the gravitational direction, to the fill level (h).

6. The method according to claim 1 wherein:

the respective volume flow of liquid of the seat cleaning flow (R1, R2) is restricted and/or deflected and fed such that the pressure on the leakage-cavity-side section of the seating (2b, 2a) of the other closing member (4, 3) remaining respectively in its closed position is equal to or less than the ambient pressure of the double seat valve (1).

7. The method according to claim 1 wherein:

the volume flows of liquid generated by the seat cleaning flows (R1, R2) are restricted such that the volume flows are equal to each other.

8. The method according to claim 1 wherein:

the volume flows of liquid generated by the seat cleaning flows (R1, R2) are restricted such that the volume flows discharge without backing up in the discharge bore (3d) through the latter into the area surrounding the double seat valve (1).

9. A double seat valve which has two closing members (3, 4) arranged in series and moveable relative to each other, which prevent m the closed position of the double seat valve (1) overflowing of fluid from a valve housing part (1a, 1b) of a valve housing (10) into another valve housing part (1b, 1a), which delimit between each other both in the closed as well as in the open position a leakage cavity (5), which is connected with an area surrounding the double seat valve (1) via a discharge bore (3d), which is bordered by a tube shaft designed on the first closing member (3) and fed out of the valve housing (10), wherein, in the closed position, the first closing member (3) designed as a pusher piston is received in a sealing manner in a connection opening (2c) interconnecting the valve housing parts (1a, 1b) and forming a first seating (2a) on a second closing member (4), which is assigned to a second seating (2b), and the second closing member (4) is also transferred to an open position (H) during the further opening movement, wherein the first closing member (3) has on its first end section (3*) a first seal (6), which seals radially with respect to the first cylindrical seating (2a) designed in the connection opening (2c), wherein the second closing member (4) has the recess (4b) with a cylindrical circumferential wall (4c), which is flush with the first cylindrical seating (2a), on its second end section (4*) facing the first closing member (3), and the recess (4b) is dimensioned to receive the first end section (3*) and the first radial seal (6) of the first closing member (3) in a sealing manner during the opening movement before the second closing member (4) opens, wherein the second closing member (4) can be transferred into its respective seat cleaning position through a second partial stroke (T2) directed in the same direction as the opening movement and the first closing member (3) through a first partial stroke (T1) directed opposite the opening movement, wherein a cylindrical appendage (3, 4), which forms the annular restrictor gap (D1, D2) together with the associated connection opening (2c), is arranged on the leakage cavity side on each end section (3*, 4*), wherein the first seating (2a) has a diameter that is smaller than the diameter of an annular recess (2d) assigned to the second closing member (4) in the connection opening (2c) and with a transition area (2e) between the first seating (2a) and the annular recess (2d), wherein the second closing member (4) lies in its closed position with a stop surface (4f) arranged on a front surface of its cylindrical second appendage (4**) on the transition area (2e), and namely directly adjacent to the first seating (2a) and wherein the circumferential wall (4c), on its end facing away from the first closing member (3), passes into the deflection surface (4d), the contour (K) of which, as seen in the meridian cut, has a bend-free progression, wherein the deflection surface (4d) completely borders the remaining area of the recess (4b) not delimited by the circumferential wall (4c) and opens out from the second closing member (4) at a front and radially inside end (4e) of the second closing member (4) facing the first closing member (3), a front surface of the second closing member (4) located outside of the recess (4b).

10. The double seat valve according to claim 9, wherein:

the front and radially inside end (4e) of the second closing member (4), seen in the longitudinal axis of the double seat valve (1), protrudes over an imaginary space, which is delimited on the front side by a plane (E) passing through the stop surface (4f).

11. The double seat valve according to claim 9, wherein
the valve housing parts (1a, 1b) are designed according to the greatest nominal passage cross-section ($A_O$) of a tube conduit that can be connected to the latter and interconnected via the seat ring (2) forming the connection opening (2c) on the inside, that a connection part (3b) of the tube shaft, which forms a section of the discharge bore (3d) on the inside, penetrates at least the connection opening (2c) during the full opening stroke (H) of the double seat valve (1) and is measured there radially on the outside such that the connection opening (2c) at its narrowest point forms an annular space with an annular space passage cross-section ($A_R$), which at least corresponds with the nominal passage cross-section ($A_O$) ($A_R \geq A_O$).

12. The double seat valve according to claim 11, wherein the discharge bore (3d) tapers from the leakage cavity side end of the first closing member (3) into an inlet funnel (3f) in a conical manner and continuously up to the connection part (3b) and has in the latter on a delimited length (1) an unchanged, minimal discharge cross-section (a).

13. The double seat valve according to claim 11, wherein the discharge bore (3d) is delimited radially outside by the connection part (3b) and a first pressure compensating piston (3c), wherein the pressure compensating piston (3c) has an outer diameter corresponding with the first seating (2a).

14. The double seat valve according to claim 12, wherein the inlet funnel (3f) with a volume of liquid backing up in it forms a fill level (h), the hydrostatic pressure ($\Delta p_{hydr}$) of which is sufficient in order to convey the volume flow of liquid generated in the respective seat cleaning position at least through the minimal discharge cross-section (a) of the connection part (3b), which connects, as seen from the gravitational direction, to the fill level (h).

15. The double seat valve according to claim 9, wherein a radial second gap width (s2) of the second restrictor gap (D2) is designed smaller than a radial first gap width (s1) of the first restrictor gap (D1).

16. The double seat valve according to claim 15, wherein the annular restrictor gaps (D1, D2) with their radial gap width (s1, s2) and an associated length (l1, l2) are such that the volume flows of liquid generated by the associated seat cleaning flows (R1, R2) in the respective seat cleaning positions with the partial strokes (T1, T2) are equal.

17. The double seat valve according to claim 9 wherein: the contour (K) consists of a sequence of bent sections, each of which has a common tangent at its transition points.

18. The double seat valve according to claim 9, wherein a first adjusting rod (3a) connected with the first closing member (3) is reduced in cross-section at least in the axial extension area of the connection part (3b), and namely to a cross-section-reduced valve rod area (3h).

19. The double seat valve according to claim 9, wherein the cylindrical appendage (3, 4) is on its circumferential surface delimiting the associated restrictor gap (D1, D2) in the form of a labyrinth seal.

20. The double seat valve according to claim 19, wherein the labyrinth seal is in the form of a number of circumferential grooves.

21. The double seat valve according to claim 19, wherein the labyrinth seal is in the form of a number of recesses that are not connected with each other, that are distributed over the circumferential surface of the cylindrical appendage (3, 4) and that are restricted in terms of their area at the respective location of their formation.

* * * * *